United States Patent [19]

Scheps

[11] Patent Number: 5,121,402
[45] Date of Patent: Jun. 9, 1992

[54] MULTIPLE ELEMENT RING LASER

[75] Inventor: Richard Scheps, Del Mar, Calif.

[73] Assignee: The United State of America as represented by the Secretary of the Navy, Washington, D.C.

[21] Appl. No.: 593,417

[22] Filed: Sep. 28, 1990

[51] Int. Cl.[5] ............................................. H01S 3/091
[52] U.S. Cl. ...................................... 372/70; 372/10; 372/18; 372/22; 372/75; 372/92; 372/94
[58] Field of Search ...................... 372/94, 97, 68, 70, 372/71, 75, 92, 93, 18, 22, 10

[56] References Cited

U.S. PATENT DOCUMENTS

| | | | |
|---|---|---|---|
| 3,479,620 | 11/1969 | Rigrod | 372/19 |
| 3,530,388 | 9/1970 | Guerra et al. | 372/94 X |
| 3,545,866 | 12/1970 | Jacobs et al. | 356/350 |
| 4,284,964 | 8/1981 | Maier, Jr. | 372/32 |
| 4,525,843 | 6/1985 | Diels | 372/94 |
| 4,731,795 | 3/1988 | Clark et al. | 372/107 |
| 4,739,507 | 4/1988 | Byer et al. | 372/22 |
| 4,756,002 | 7/1988 | Ruggieri et al. | 372/70 |
| 4,785,459 | 11/1988 | Baer | 372/75 |
| 4,829,532 | 5/1989 | Kane | 372/20 |
| 4,879,723 | 11/1989 | Dixon et al. | 372/21 |
| 4,933,947 | 6/1990 | Anthon et al. | 372/34 |
| 4,951,294 | 8/1990 | Basu et al. | 372/75 |
| 5,014,279 | 5/1991 | Esterowitz et al. | 372/41 |

Primary Examiner—James W. Davie
Attorney, Agent, or Firm—Harvey Fendelman; Thomas Glenn Keough

[57] ABSTRACT

A multiple gain-element ring laser has the capability of being scaled to higher CW or pulsed output powers. Optical pumping is accommodated in a plurality of optically interconnected single gain-element "building blocks", each made up of a mirror associated with a gain element, such as Nd:YAG or Nd:YVO$_4$, pumped by the optical pumping light from, for example, separate diodes in a focus (waist) at or near an exterior face of each gain element. A resonator mode is established in each gain element which also comes to a focus (waist) at or near the same exterior face in each gain element of the multi-element ring laser. Concatenating the gain elements and the associated mirrors into a desired multiple gain-element ring laser configuration provides for good overlap between the pump light from the several diodes and the resonator mode to achieve desired power levels at an improved efficiency. inclusion of a Q-switch and/or mode locker provides Q-switched and/or mode locked operation. Inclusion of a nonlinear crystal allows a high energy efficiency conversion to a different frequency. All gain elements, mirrors and intra-cavity elements are provided with appropriate optical coatings. Second harmonic generation is a selectable option that is also single frequency and amplitude stable. A further feature is that wavelength tuning is provided for by, for example, mounting one of the ring elements on a piezoelectric driven mount.

50 Claims, 1 Drawing Sheet

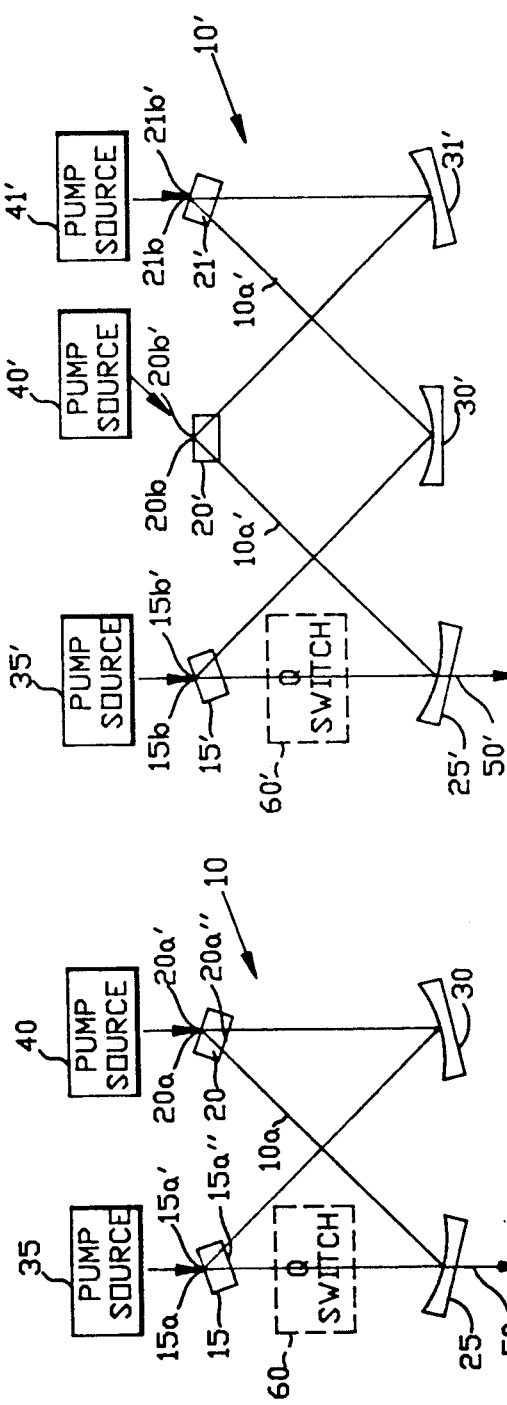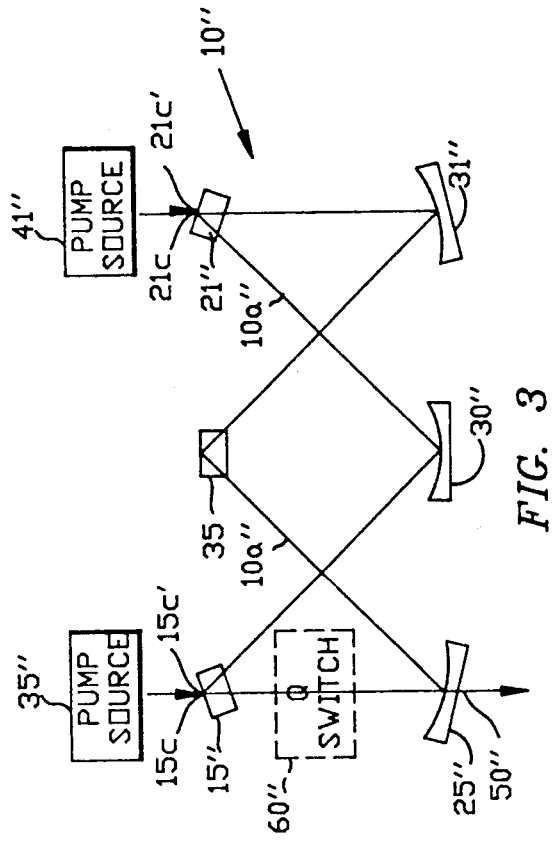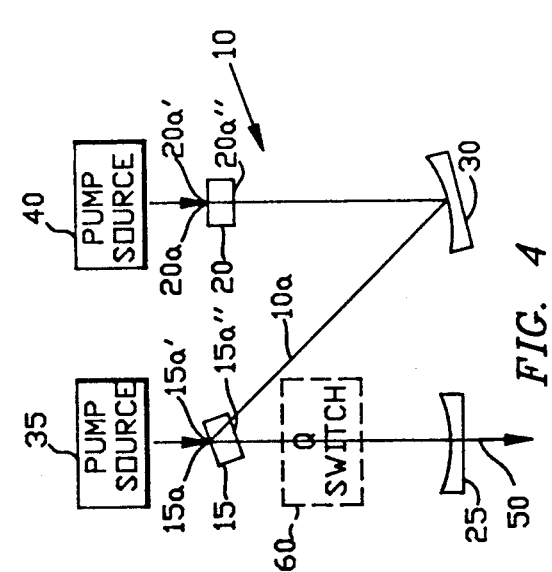

／5,121,402

MULTIPLE ELEMENT RING LASER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Contemporary longitudinally-pumped laser diode-pumped lasers have relied on laser diode pump sources with the limitation that the diodes are generally low power devices. Therefore, the laser output power has been limited by the power available from the laser diodes employed. While incoherent laser diodes of high power are available, these have been found to be less satisfactory since they are less efficient for longitudinal pumping than the coherent diodes. Although coherent diodes are available in powers of one to three watts each, combining more than two such diodes is generally complicated and inefficient.

A single gain-element ring laser is disclosed in the article entitled "A Single Frequency Nd:YAG Ring Laser Pumped by Laser Diodes" by Richard Scheps et al., *IEEE Journal of Quantum Electronics*, Vol. 26, No. 3, Mar. 1990. This design uses two single stripe one-watt laser diodes which form a single beam that is focused on the exterior face of a Nd:YAG rod. Single-longitudinal-mode performance for CW operation and single-transverse-multi-longitudinal-mode output performance for Q-switched operation were demonstrated in a combination of compact size and high efficiency. A design restraint on the use of the single gain-element ring laser is that its diode-pumped output power was limited by the available highest-power laser diodes which were appropriate for pumping. Combining a number of these diodes to provide for a higher output power was found to be not only cumbersome and generally inefficient, but, in addition, created a more serious impediment to the upward scaling of the output power. The heat deposited in the rod by pumping harder (using more laser diodes) puts an upper limit on how much pump power the rod can take and, hence, its upward scaling is impeded.

Thus, a continuing need exists in the state of the art for a diode pumped laser configuration having the capability for increased output powers that can be efficiently optically pumped.

SUMMARY OF THE INVENTION

The present invention is directed to providing a multiple gain-element optically pumped laser capable of being scaled to higher output powers. A plurality of optically interconnected gain-elements, such as Nd:YAG or Nd:YVO4, are end-pumped by the optical pump light coming from separate pump sources in a focus (waist) at or near the exterior face of each gain element which coincides with a common resonator mode in each element. Concatenating the gain elements with their associated mirrors into a desired multiple gain-element laser configuration provides for good overlap between the pump light and the resonator mode to achieve desired power levels at an improved efficiency. Q-switching may be provided for or the inclusion of a nonlinear crystal allows a high power conversion efficiency to a different frequency.

An object of the invention is to provide a ring laser with an improved power output.

Another object of the invention is to provide a standing wave laser with an improved power output.

Another object is to provide a ring laser with a single frequency laser output with an improved electrical efficiency.

Another object is to provide a ring laser with a harmonic single frequency laser output created by applying a harmonic generating means, such as a second harmonic generating crystal.

Still another object is to provide for an improved ring laser capable of operating in the CW mode and the Q-switched mode at higher output power levels.

These and other objects of the invention will become more readily apparent from the ensuing specification and drawings when taken in conjunction with the appended claims.

BRIEF DESCRIPTION OF THE DRAWINGS

FIG. 1 is a schematic representation of one embodiment of the multiple gain-element ring laser fabricated in accordance with this inventive concept.

FIG. 2 is another embodiment of the multiple gain-element ring laser fabricated in accordance with this inventive concept.

FIG. 3 shows still another embodiment of the multiple gain-element ring laser.

FIG. 4 shows a standing wave configuration of the embodiment of FIG. 1 for a multiple gain-element laser.

DESCRIPTION OF THE PREFERRED EMBODIMENT

Referring now to the drawings, several demonstrative embodiments of a multiple gain-element ring laser 10, 10' and 10" are improvements to the single gain-element ring laser referred to above but which allow scaling to much higher power levels. The embodiments portrayed in the accompanying figures show but three configurations for the purposes of explanation. As will become apparent to one of ordinary skill in the art to which this invention pertains who has the teachings of this invention at hand, other elements, additional or less elements could be provided for to create other power levels or to establish other resonances, for example, to accommodate a task at hand. The term "ring laser" has the usual meaning associated with this term, which is, a laser in which the resonant mode is a travelling wave instead of a standing wave.

The single gain-element ring laser has been demonstrated as reported in the above cited publication to produce over one-half watt power when appropriately end-pumped by laser diodes. A feature that makes the disclosed single gain-element ring laser attractive is that the resonator mode (that is, the pattern of radiation within the ring laser) comes to a focus (waist) at or near the exterior face of the Nd:YAG gain-element rod. The laser diode pump light is focused at or near this same waist in the longitudinal axis (resonator axis) of the Nd:YAG gain-element rod to get a very good overlap between the pump light and the resonator mode. This overlap and manner of providing for an energy input at the waist results in an improved efficiency for a single rod but inherently has a maximum power limitation.

The multiple gain-element ring laser of this invention accommodates additional diode pumping by improving upon the design of the single gain-element ring laser to allow for increased output levels. The multiple gain-element ring laser advantageously employs the realization that the laser light is not absorbed and is transparent in each of the gain elements of the multiple gain-element ring laser while the gain in each of the gain elements of the multiple gain-element ring laser is a function of the magnitude of the optical pump power to which it is subjected. Thus, a plurality of gain elements individually can be end or side pumped by separate optical pumps up to their maximum tolerable levels and their aggregate resonance mode outputs are added to provide a greater total laser output power. In other words, the multiple gain-element ring laser thusly avoids the limitations to scaling which may have confronted designers attempting to increase the output of the single gain-element ring laser (the resulting single gain-element ring laser had heat limitations) by over-pumping the gain-element rod with too much pump power.

The multiple gain-element ring laser appropriately orients a desired number of gain elements and mirrors for a desired laser output level. The resonator mode comes to a focus (waist) at or near the exterior face of each gain element thereby allowing high efficiency from additional gain elements when each gain element is individually pumped at its own waist by its own power source.

Referring now to FIG. 1 of the drawings, one embodiment of the multiple element-gain ring laser 10 has two gain-elements 15 and 20, such as Nd:YAG or Nd:YVO$_4$, and a pair of flat mirrors or radius of curvature reflective mirrors 25 and 30, one of which will generally be the output coupler. Gain-elements 15 and 20 are properly oriented to be individually, longitudinally pumped in their resonator axes at a waist 15a and 20a at or slightly inside of an exterior face 15a' and 20a' by an appropriately aligned and focussed diode or diodes or other suitable CW or pulsed pump source 35 and 40.

The resonator mode energy in a radiation pattern 10a within multiple gain-element ring laser 10 also is brought to a focus at or near waist 15a and 20a at or near exterior face 15a' and 20a' of each of the gain-elements 15 and 20, respectively. Mirrors 25 and 30 can be, for example, radius of curvature mirrors that are oriented to appropriately direct the resonator mode radiation with respect to the waists of the two gain elements, to thereby assure that the pattern of radiation is such as to maximize overlap with the pump radiation at the waists and provide optimum efficiency and power output 50.

In FIG. 1 mirror 25 is the output coupler and mirror 30 is highly reflective. Any exterior facet of either the gain elements or the mirrors can be the output coupler as desired for an intended application. Furthermore, although the mirror surfaces are depicted as being curved, the faces of the mirrors, as well as the faces 15a' and 20a' and interior faces 15a" and 20a" of the laser gain elements 15 and 20 can be flat or curved, coated or not coated as a particular application calls for (the surfaces and faces of other embodiments to be described as well as those within the scope of this inventive concept also may be so configured to accommodate a given application). The transmissive output percentage can be varied or can be a complete reflection for one or both of the mirrors or gain elements in accordance with the desired operational characteristics.

Since precise alignment is called for, the mirrors and gain elements will also include a suitable directional imparting or aligning device to assure fine angular and frequency tuning. A commercially available piezoelectric mirror mount could be provided, such as used in the above cited article, or other arrangements well known to those versed in relevant art could be selected. Suitable coatings for the mirrors and their associated objects could also be provided and output 50 shown with respect to mirror 25 could as well have been provided through mirror 30. Other output coupling techniques could be selected and the output coupling percentages can be varied as referred to in the preceding paragraph. The coatings on the mirrors, as well as the interior and exterior faces of the gain elements can be selected as a matter of routine choice by one skilled in the art to provide the desired operational characteristics. The selected gain element coating may be applied on the exterior and/or interior exposed surfaces, if desired. A typical coating on the interior surface may be an anti reflective coating at 1.06μ and on the exterior surface it could be highly reflective at 1.06μ and highly transmissive at 808 nm, for example. Numerous commercial suppliers have available a wide variety of selectable items.

Looking now to FIG. 2, three gain-elements 15', 20' and 21' are disposed in multiple gain-element ring laser 10'. Each gain-element has a CW or pulsed optical pump 35', 40' or 41' aligning its respective pumping energy with each gain element's longitudinal, resonator axis and focusses its pumping energy at or near a resonator waist 15b, 20b or 21b of a respective gain-element rod 15', 20' or 21', respectively. All three gain elements are pumped by separate individual or combinations of laser diodes or other optical sources at the three waists 15b, 20b and 21b, which are at or near the exterior face 15b', 20b' or 21b' of each rod 15', 20' and 21', respectively.

Appropriate mirrors 25', 30' and 31' are properly disposed and angularly oriented by suitable adjustment elements, not shown, to assure a radiation path 10a' within multiple gain-element ring laser 10'. The pump light from each of the optical pumps is oriented and focused at or near the resonator waists of the respective gain-element. Good overlap between the pump light provided by the optical pump and the resonator mode are assured so that increased good efficiency is the natural consequence. This device will have roughly three times the output power of a single gain-element ring laser. The output from this configuration may come from any mirror and/or gain element by the proper selection of components.

Looking to FIG. 3 a multiple gain-element ring laser 10" has two gain-element rods 15" and 21" plus a second harmonic generating (SHG) crystal 35. Since the resonator mode goes through a focus at or near each turning point on the upper part of the figure, putting a second harmonic generating crystal 35 at one of the turning points allows high efficiency conversion of the output to a second harmonic frequency which could be, for example, green light. The exterior face of harmonic crystal 35 may be coated to reflect the resonator mode, or an external mirror may be used for this purpose. Optical pumps 35" and 41" are oriented to appropriately focus CW or pulsed pump light at or near a waist 15c and 21c which are at or near an exterior face 15c' and 21c' of each gain-element to get a good overlap between the diode pump light and the resonator mode and thereby increase efficiency. Mirrors 25", 30" and 31" are properly oriented in accordance with known techniques to maintain a resonator mode pattern of radiation 10a" within ring laser 10" that focusses at or near the pump waists in gain elements 15″ and 21″ and at or near the exterior face of crystal 35.

The multiple gain-element ring lasers of FIGS. 1, 2 and 3 are compact and more efficient than conventional designs and avoid the limitations which might otherwise prevent the simply upward scaling of a single gain-element ring laser, namely the generation of heat in the gain element by over pumping each gain-element. By basically repeating the gain-element plus mirror building block in the manner herein disclosed, a desired power level may be attained by a designer. It is essential, however, that at or near the exterior face of each gain-element, the resonator mode and the pumping mode come to a focus (waist), thusly allowing high efficiency from additional gain elements and mirrors when each gain element is individually pumped by its own laser diode or other suitable pumping source.

A variety of pumping methods may be selected, not only the laser diodes referred to herein, so long as the pumping source is appropriate to effect the desired lasing which may be in a CW or pulsed mode in accordance with the components selected and/or the job at hand. Various solid state materials, liquid or gaseous state gain media can be used as the gain-elements depending on the desired lasing. Side pumping, as well as end pumping may be employed as an option. The multiple gain-element ring laser may be fabricated from other combinations of gain elements and mirrors or gain elements, lenses and or other related components to provide a desired output power level and/or frequency response. The number of gain-elements and associated components may be varied to make the output power a scaleable function which is inherently more efficient than the contemporary design. A laser output is provided which can be doubled, mode-locked and/or Q-switched as called for in a particular application.

This inventive concept is capable of being frequency doubled (such as described with respect to FIG. 3), mode locked and/or Q-switched by merely including the well known components in the optical path. An acousto-optic Q switch 60 could be included, as shown in phantom in FIG. 1, between a rod and a mirror closest to it if Q-switched operation is desired. Accommodation for the size of Q-switch 60 may call for opening the ring width somewhat. An SHG crystal can be placed in the ring as well, but not necessarily as shown in FIG. 3. For example, in FIG. 1 the SHG crystal can be placed adjacent to one of the gain elements.

In addition, noting FIG. 4, with a slight adjustment of at least one of the angles of the gain elements and mirrors, of any of the envisioned embodiments described and those configurations of this inventive concept that will become apparent to those versed in the art, the ring laser is convertible to a standing wave laser configuration possessing all the scaling benefits of the multi-element ring laser.

Furthermore, the higher energy output levels associated with this inventive concept can be at a single frequency as well as a narrow bandwidth output.

Obviously, many other modifications and variations of the present invention are possible in light of the above teachings. It is therefore to be understood that within the scope of the claims the invention may be practiced otherwise than as specifically described.

What is claimed is:

1. A multiple gain-element ring laser for emitting high power output levels comprising:

a plurality of sources of focused optical pumping energy;

a plurality of gain-elements each having the property to emit resonator mode radiation as it is appropriately end pumped by at least one of said plurality of sources of focused optical pumping energy, each of said plurality of gain-elements is disposed to receive said focused optical pumping energy from at least one of said plurality of sources of focused optical pumping energy in a longitudinal resonator axis therein at a pump waist (focus) located at or near an exterior face thereof to emit said resonator mode radiation therefrom; and a plurality of mirrors each disposed to receive said resonator mode radiation from said plurality of gain-elements and having a configuration and orientation to reflect said resonator mode radiation in a closed radiation path extending between said plurality of gain elements and said plurality of mirrors in said ring laser to include said pump waist (focus) of each of said plurality of gain-elements, one of said plurality of mirrors being partially reflective to assure said high power output levels.

2. A multiple gain-element ring laser according to claim 1 in which said higher power output levels are scaleable as a function of the number of said plurality of gain-elements and associated said plurality of mirrors to a desired level.

3. A multiple gain-element ring laser according to claim 1 in which said plurality of said gain elements are solid-state materials.

4. A multiple gain-element ring laser according to claim 1 in which said plurality of said gain elements are liquid-state materials.

5. A multiple gain-element ring laser according to claim 1 in which said plurality of said gain elements are gaseous-state materials.

6. A multiple gain-element ring laser according to claim 2 in which said plurality of said gain elements are solid-state materials.

7. A multiple gain-element ring laser according to claim 2 in which said plurality of said gain elements are liquid-state materials.

8. A multiple gain-element ring laser according to claim 2 in which said plurality of said gain elements are gaseous-state materials.

9. A multiple gain-element ring laser according to claim 1, 2, 3, 4, 5, 6, 7 or 8 further including:

a Q-switch interposed in said radiation path to provide for Q-switched operation.

10. A multiple gain-element ring laser according to claim 1 2, 3, 4, 5, 6, 7 or 8 further including:

a harmonic generator crystal interposed in said radiation path for the generation of at least one harmonic.

11. A multiple gain-element ring laser according to claim 1 2, 3, 4, 5, 6, 7 or 8 further including:

a mode locker interposed in said radiation path to provide for mode-locked operation.

12. A multiple gain-element ring laser according to claim 9 further including:

a mode locker interposed in said radiation path to provide for mode-locked operation.

13. A multiple gain-element ring laser according to claim 10 further including:

a mode locker interposed in said radiation path to provide for mode-locked operation.

14. A multiple gain-element ring laser according to claim 10 further including:
a Q-switch interposed in said radiation path to provide for Q-switched operation.

15. A multiple gain-element ring laser according to claim 12 further including:
a harmonic generator crystal interposed in said radiation path for the generation of at least one harmonic.

16. A multiple gain-element ring laser according to claim 1, 2, 3, 4, 5, 6, 7 or 8 in which said higher power output levels is at a single frequency.

17. A multiple gain-element ring laser according to claim 9 in which said higher power output levels is at a single frequency.

18. A multiple gain-element ring laser according to claim 10, in which said higher power output levels is at a single frequency.

19. A multiple gain-element ring laser according to claim 11, in which said higher power output levels is at a single frequency.

20. A method of emitting higher power output levels from a multiple gain-element ring laser comprising:
focusing optical pumping energy from a plurality of sources of optical pumping energy;
providing a plurality of gain-elements each having the property to emit resonator mode radiation as it is appropriately end pumped by focused optical pumping energy, each of said plurality of gain-elements is disposed to receive said focused optical pumping energy from at least one of said plurality of sources of optical pumping energy in a longitudinal resonator axis therein at a pump waist (focus) located at or near an exterior face thereof to emit resonator mode radiation therefrom;
reflecting said resonator mode radiation by a each of a plurality of mirrors, each having a configuration and orientation to receive said resonator mode radiation from said plurality of gain-elements in a closed radiation path extending between said plurality of gain elements and said plurality of mirrors in said ring laser to include said pump waist (focus) of each of said plurality of gain-elements; and
emitting said higher power output levels from said multiple gain-element ring laser from at least one of said plurality of gain-elements and said plurality of mirrors which is partially reflective.

21. A method according to claim 20 further including:
scaling said higher power output levels by including an appropriate number of said plurality of gain-elements and associated said plurality of mirrors to achieve a desired level.

22. A method according to claim 20 further including:
appropriately orientating at least one of the gain-elements and mirrors to provide a standing wave configuration.

23. A method according to claim 21 further including:
appropriately orientating at least one of the gain-elements and mirrors to provide a standing wave configuration.

24. A method according to claim 20 in which said higher power output levels is at a single frequency.

25. method according to claim 21 in which said higher power output levels is at a single frequency.

26. A method according to claim 22 in which said higher power output levels is at a single frequency.

27. A multiple gain-element laser for emitting high power output levels comprising:
a plurality of sources of focused optical pumping energy;
a plurality of gain-elements each having the property to emit resonator mode radiation as it is appropriately end pumped by at least one of said plurality of sources of focused optical pumping energy, each of said plurality of gain-elements is disposed to receive said focused optical pumping energy from at least one of said plurality of sources of focused optical pumping energy in a longitudinal resonator axis therein at a pump waist (focus) located at or near an exterior face thereof to emit said resonator mode radiation therefrom; and
a plurality of mirrors each disposed to receive said resonator mode radiation from said plurality of gain-elements and having a configuration and orientation to reflect said resonator mode radiation in a closed radiation path extending between said plurality of gain elements and said plurality of mirrors in said laser to include said pump waist (focus) of each of said plurality of gain-elements, one of said plurality of mirrors being partially reflective to assure said high power output levels.

28. A multiple gain-element laser according to claim 27 in which said higher power output levels are scaleable as a function of the number of said plurality of gain-elements and associated said plurality of mirrors to a desired level.

29. A multiple gain-element laser according to claim 27 in which said plurality of said gain elements are solid-state materials.

30. A multiple gain-element laser according to claim 27 in which said plurality of said gain elements are liquid-state materials.

31. A multiple gain-element laser according to claim 27 in which said plurality of said gain elements are gaseous-state materials.

32. A multiple gain-element laser according to claim 28 in which said plurality of said gain elements are solid-state materials.

33. A multiple gain-element laser according to claim 28 in which said plurality of said gain elements are liquid-state materials.

34. A multiple gain-element laser according to claim 28 in which said plurality of said gain elements are gaseous-estate materials.

35. A multiple gain-element laser according to claim 27, 28, 29, 30, 31, 32, 33 or 34 further including:
a Q-switch interposed in said radiation path to provide for Q-switched operation.

36. A multiple gain-element laser according to claim 27, 28, 29, 30, 31, 32, 33 or 34 further including:
a harmonic generator crystal interposed in said radiation path for the generation of at least one harmonic.

37. A multiple gain-element laser according to claim 27, 28, 29, 30, 31, 32, 33 or 34 further including:
a mode locker interposed in said radiation path to provide for mode-locked operation.

38. A multiple gain-element laser according to claim 35 further including:
a mode locker interposed in said radiation path to provide for mode-locked operation.

39. A multiple gain-element laser according to claim 36 further including:
a mode locker interposed in said radiation path to provide for mode-locked operation.

40. A multiple gain-element laser according to claim 36 further including:
a Q-switch interposed in said radiation path to provide for Q-switched operation.

41. A multiple gain-element laser according to claim 38 further including:
a harmonic generator crystal interposed in said radiation path for the generation of at least one harmonic.

42. A multiple gain-element laser according to claim 27, 28, 29, 30, 31, 32, 33 and 34 in which said higher power output levels is at a single frequency.

43. A multiple gain-element laser according to claim 35 in which at least one of the gain-elements and mirrors is appropriately orientated to provide a standing wave configuration.

44. A multiple gain-element laser according to claim 36 in which at least one of the gain-elements and mirrors is appropriately orientated to provide a standing wave configuration.

45. A multiple gain-element ring laser according to claim 37 in which at least one of the gain-elements and mirrors is appropriately orientated to provide a standing wave configuration.

46. A multiple gain-element laser according to claim 38 in which at least one of the gain-elements and mirrors is appropriately orientated to provide a standing wave configuration.

47. A multiple gain-element laser according to claim 39 in which at least one of the gain-elements and mirrors is appropriately orientated to provide a standing wave configuration.

48. A multiple gain-element laser according to claim 40 in which at least one of the gain-elements and mirrors is appropriately orientated to provide a standing wave configuration.

49. A multiple gain-element laser according to claim 41 in which at least one of the gain-elements and mirrors is appropriately orientated to provide a standing wave configuration.

50. A multiple gain-element laser according to claim 42 in which at least one of the gain-elements and mirrors is appropriately orientated to provide a standing wave configuration.

* * * * *